United States Patent
Miyabe

(10) Patent No.: US 8,559,441 B2
(45) Date of Patent: Oct. 15, 2013

(54) VIRTUAL PRIVATE NETWORK APPARATUS FOR PROVIDING VPN SERVICES TO CONNECT PLURAL BASES

(75) Inventor: Masatake Miyabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1309 days.

(21) Appl. No.: 12/040,069

(22) Filed: Feb. 29, 2008

(65) Prior Publication Data

US 2008/0232384 A1    Sep. 25, 2008

(30) Foreign Application Priority Data

Mar. 19, 2007    (JP) .................................. 2007-071145

(51) Int. Cl.
*H04L 12/28* (2006.01)

(52) U.S. Cl.
USPC ........................ 370/395.31; 370/401; 370/409

(58) Field of Classification Search
None
See application file for complete search history.

(56) References Cited

U.S. PATENT DOCUMENTS

| | | | |
|---|---|---|---|
| 2004/0117498 A1* | 6/2004 | Hashimoto et al. | 709/230 |
| 2011/0119753 A1* | 5/2011 | Smith | 726/13 |
| 2012/0008635 A1* | 1/2012 | Kuo et al. | 370/410 |

OTHER PUBLICATIONS

K. Kompella, & Y Rekhter, ED., "Virtual Private LAN Service (VPLS) Using BGP for Auto-discovery and Signaling, draft-ietf-l2vpn-vpls-bgp-08", Network Working Group, Internet-Draft, Juniper Networks, Jun. 21, 2006, pp. 1-37.

Marc Lasserre & Vach Kompella (Editors), "Virtual Private LAN Services Using LDP", Internet Draft Document, L2VPN Working Group, draft-ietf-l2vpn-vpls-ldp-09.txt, Jun. 2006, pp. 1-27.

"ESRP (Extreme Standby Router Protocol)", ESRP/ Configuration Guide/ Technology/ Extreme Networks, pp. 1 & 2, with English Translation (pp. 1-3). Nov. 20, 2007.

* cited by examiner

*Primary Examiner* — Ian N Moore
*Assistant Examiner* — Tito Pham
(74) *Attorney, Agent, or Firm* — Katten Muchin Rosenman LLP

(57) ABSTRACT

A VPN apparatus is included in a VPN system with other VPN apparatuses to interconnect bases including first bases each having an access line and a second base having at least two access lines. The VPN apparatus comprises a first virtual VPN apparatus and a second virtual VPN apparatus. The first virtual VPN apparatus is connected to one of the first bases via an access line and carries out frame forwarding by using a first forwarding table for forwarding frames to be transmitted/received between two first bases or between one first base and one second base. The second virtual VPN apparatus is connected to the second base via one of the at least two access lines, carries out frame forwarding by using a second forwarding table for forwarding frames to be transmitted/received between at least two bases including the second base, and does not carry out forwarding frames to one of the other VPN apparatuses that is connected to the second base via another one of the at least two access lines.

7 Claims, 6 Drawing Sheets

FIG. 10

| VPN NO. | V-PE NO. | DESTINATION MAC ADDRESS | TRANSMISSION DESTINATION |
|---|---|---|---|
| #100 | #1-1 | TERMINAL 1 OF BRANCH #2 | PW#9 |
| #100 | #1-1 | TERMINAL 2 OF BRANCH #2 | PW#9 |
| #100 | #1-1 | TERMINAL 1 OF BRANCH #3 | PW#13 |
| #100 | #1-1 | TERMINAL 1 OF BRANCH #4 | ACCESS LINE 24 |
| #100 | #1-1 | TERMINAL 1 OF HEAD OFFICE | V-PE #1-2 |
| #100 | #1-2 | TERMINAL 1 OF BRANCH #2 | PW#1 |
| #100 | #1-2 | TERMINAL 2 OF BRANCH #2 | PW#1 |
| #100 | #1-2 | TERMINAL 1 OF BRANCH #3 | PW#3 |
| #100 | #1-2 | TERMINAL 1 OF BRANCH #4 | V-PE #1-1 |
| #100 | #1-2 | TERMINAL 1 OF HEAD OFFICE | ACCESS LINE 25 |

38A = top 5 rows; 38B = bottom 5 rows

* PW: PSEUDOWIRE

FIG. 11

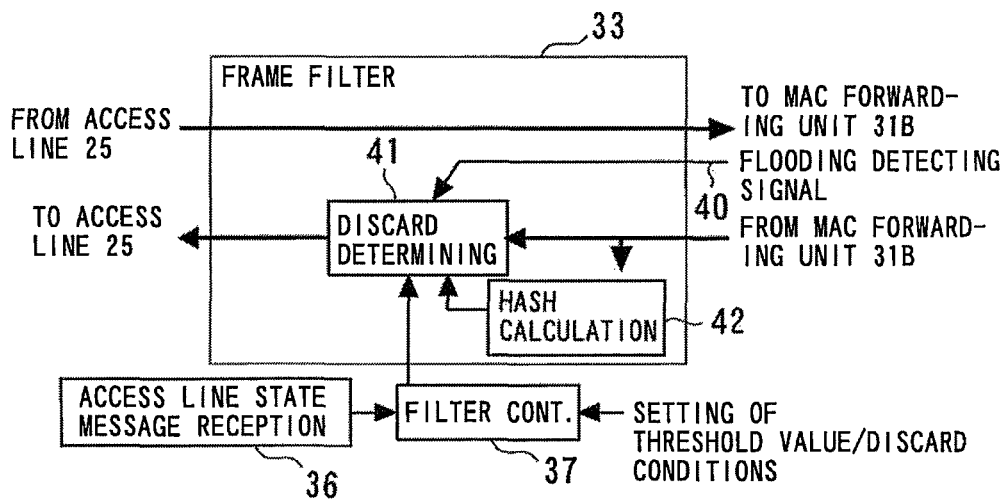

FIG. 12

| TRANSMISSION SOURCE PE OR V-PE IDENTIFIER | DESTINATION PE OR V-PE IDENTIFIER | ACCESS LINE ABNORMALITY DETECTION INFORMATION |
|---|---|---|

VIRTUAL PRIVATE NETWORK APPARATUS FOR PROVIDING VPN SERVICES TO CONNECT PLURAL BASES

BACKGROUND

The invention relates to a communication apparatus (virtual private network (VPN) apparatus) for providing VPN services to customers having a plurality of bases, for example, a VPN apparatus for providing Ethernet (registered trademark) LAN services by using a virtual private LAN service (VPLS).

For example, in a communication apparatus which provides Ethernet (registered trademark) LAN services (hereinafter, referred to as "E-LAN" services), an extreme standby router protocol (ESRP, registered trademark) is well-known as a technology of making an accommodation base redundant. The ESRP (registered trademark) is an Ethernet (registered trademark)/IP layer redundancy technology developed by Extreme Networks Inc.

FIG. 1 shows an outline of an operation of the ESRP (registered trademark). In an example shown in FIG. 1, a customer Ethernet (registered trademark) network 1 is accommodated in two provider edge switches (hereinafter, referred to as "PE") 2 and 3 via two access lines A1 and A2. The PEs 2 and 3 are connected to a provider Ethernet (registered trademark) network 4. In FIG. 1, the PE 2 is in an active state (ACT) while the PE 3 is in a standby state (STBY).

The ESRP (registered trademark) is carried out between the PE 2 and the PE 3. Between the PE 2 and the PE 3 where the ESRP (registered trademark) is carried out, a special Ethernet (registered trademark) frame (hereinafter, referred to as "hello frame") called ESRP (registered trademark) hello is forwarded. Each of the PEs 2 and 3 recognizes a state of the PE (one of active and standby states) based on setting information or failure information in the hello frame.

The PE 2 having the active state operates as a normal Ethernet (registered trademark) switch (hereinafter, referred to as "E-switch") except for exchange of a hello frame message with the PE 3 having the standby state. Accordingly, communication can be carried out between the customer Ethernet network 1 and the provider Ethernet network 4 through the PE 2 (refer to customer traffic as shown in FIG. 1).

On the other hand, the PE 3 having the standby state discards an Ethernet (registered trademark) frame (hereinafter, referred to as "E-frame") inputted to the PE 3 itself (refer to block of FIG. 1) except for exchange of a hello frame message with the PE 2 having the active state. Accordingly, looping of the E-frame is prevented.

As shown in FIG. 2, when a failure occurs in the PE 2 in the active state, the PE 3 in the standby state recognizes this failure through the hello frame, changes its own state from the standby state to an active state, and releases blocking the E-frame. Accordingly, a state is set where user traffic (customer traffic) passes through the PE 3 newly set in the active state.

As a method of providing the E-LAN services, a technology called a virtual private LAN service (VPLS) has been discussed with the Internet Engineering Task Force (IETF) taking the lead. Internet drafts such as "draft-ietf-12vpn-vpls-ldp-09.txt" or "draft-ietf-12vpn-vpls-bgp-08.txt" have been issued, and standardization of the VPLS has been pursued.

FIG. 3 shows an operation of the VPLS. The VPLS configures an Ethernet (registered trademark) virtual private network (VPN) (hereinafter, referred to as "E-VPN") for customers on a provider's multi-protocol label switching (MPLS) network which functions as a VPLS network. Customers have a plurality of bases (in this example, a customer head office and customer branches), and each base is accommodated in the PE through an access line.

In the example shown in FIG. 3, PEs 6 to 8 are connected to the provider MPLS network (provider network) 5. The PE 6 accommodates three customer bases (head office, and branches #3 and #4) via individual access lines A. The PE 7 accommodates a base (branch #2) via an access line A. The PE 8 accommodates a base (branch #1) via an access line A.

The PEs 6 to 8 are connected in a full mesh shape via pseudo lines called "Pseudowire". The Pseudowire is a technology of emulating lines such as the Ethernet (registered trademark), an asynchronous forward mode (ATM), or a frame relay (FR) in a packet network. Standardization of the Pseudowire has been pursued by the IETF, and is described in RFC 3985. The Pseudowire in the specification is, for example, a pseudo line for emulating an E-line in the MPLS network. The Pseudowire will be referred to as "pseudo line" hereinafter.

Each of the PEs 6 to 8 shown in FIG. 3 forwards an E-frame received from the access line A or the pseudo line PW by the same process as that of a normal E-switch. However, in the case of the E-frame received from the pseudo line PW, no forwarding and flooding are carried out for the other pseudo lines. Only this point is different from the normal E-switch. This is called "split horizon"

Referring to FIG. 3, the split horizon will be described. For example, the PE 7 permits forwarding of E-frames received from the branch #2 to the PE 6 and/or the PE 8. On the other hand, the PE 7 permits forwarding of E-frames received from the PE 6 to the branch #2, but not to the PE 8 (no forwarding is carried out). Further, the PE 7 permits forwarding of E-frames received from the PE 8 to the branch #2, but not to the PE 6. This split horizon prevents looping of the E-frames in the provider network 5.

[Non-Patent document 1] "Configuration Guide ESRP (registered trademark)", [retrieved on Nov. 15, 2006], Internet <URL□http://www.extremenetworks.co.jp/technology/configure#guide/ESRP/index.htm

[Non-Patent document 2] "Virtual Private LAN Service (VPLS) Using BGP for Auto-discovery and Signaling", Network Working Group, Internet-Draft, K. Kompella, Ed., Y. Rekhter, Ed., Juniper Networks, Jun. 21, 2006, "draft-ietf-12vpn-vpls-bgp-08.txt"

[Non-Patent document 3] "Virtual Private LAN Services Using LDP", Internet Draft Document, L2VPN Working Group, Marc Lasserre, Vach Kompella (Editors), June 2006, "draft-ietf-12vpn-vpls-ldp-09.txt"

In the ESRP (registered trademark), only one of redundant PEs is set in an active state, thereby preventing looping of the E-frames. Thus, for example, even when two PEs accommodate one customer base by using two active lines, customer traffic always flows only to a PE in an active state. A bandwidth of an access line of a side connected to a PE in the standby state is not used before a state of the PE becomes active. Accordingly, only half of a bandwidth for the two access lines is always used.

In the VPLS, when one customer base is accommodated in a plurality of PEs by a method of not setting one of the two access lines in a standby state as in the case of the ESRP (registered trademark), the following two problems occur.

The first problem is the occurrence of looping of the E-frames. FIG. 4 shows a situation of looping of the E-frames. A case where a customer (user) tries to make a head office redundant by using two access lines A1 and A2 to improve failure resistance of a connection between the head office and an E-VPN will be assumed. In FIG. 4, the E-VPN includes a provider MPLS network 5 equipped with a plurality of PEs #1 to #4 for accommodating customer bases.

In this case, as shown in FIG. 4, looping occurs between the head office and the E-VPN. In other words, the E-frame transmitted from the head office to the PE #4 is forwarded from the PE #4 to the PE #1 through the pseudo line PW. In this case, as an access line for connecting the PE #1 to the head office is not a pseudo line, the PE #1 permits forwarding of the E-frame to the head office. As a result, the E-frame returns to the head office. When the head office transmits an E-frame to the PE #1, the E-frame returns to the head office via the PE #1 and the PE #4. Different from a loop in the provider network 5, such a loop is not eliminated in the split horizon which inhibits forwarding from one pseudo line to another.

The second problem is a possibility of double arrival from another base. FIG. 5 shows double arrival of E-frames. In FIG. 5, in the network configuration shown in FIG. 4, a terminal (not shown) in a branch #1 as one of a plurality of bases transmits an E-frame to a terminal (not shown) in the head office.

Further, in FIG. 5, it is presumed that the E-VPN has not learned a forwarding destination regarding a destination node (terminal in the head office) of the E-frame. When a destination of an E-frame received by the PE #3 and directed to the head office is yet to be learned, the PE #3 executes flooding for all the pseudo lines (PW 1, PW2 and PW3 in FIG. 5). Accordingly, the PE #1 and PE #4 receive the E-frame. Then, the PE #1 executes flooding for all the access lines A1 and A3 including the head office. The PE #4 executes flooding for the access lines A2 and A4. Thus, the head office doubly receives the E-frame sent from the branch #1 through the access lines A1 and A2.

SUMMARY

An object of an embodiment of the invention is to provide a technology capable of preventing the occurrence of looping via a VPN regarding a base having a plurality of access lines.

Another object of the embodiment of the invention is to provide a technology capable of preventing duplicate arrival of the same frame to a specific base accommodated in a VPN via a plurality of access lines.

The embodiment of the invention employs the following means to achieve the objects.

That is, a first aspect of the embodiment of the invention is a virtual private network (VPN) apparatus included in a VPN system with other VPN apparatuses for providing virtual private network services to interconnect a plurality of bases including first bases each having an access line to the VPN system and a second base having at least two access lines to the VPN system, the VPN apparatus comprising:

a first virtual VPN apparatus that is connected to one of the first bases via an access line and carries out a frame forwarding process by using a first forwarding table for forwarding frames to be transmitted/received between two first bases or between one first base and one second base; and a second virtual VPN apparatus that is connected to the second base via one of the at least two access lines, carries out a frame forwarding process by using a second forwarding table for forwarding frames to be transmitted/received between at least two bases including the second base, and does not carry out forwarding frames to one of the other VPN apparatuses that is connected to the second base via another one of the at least two access lines.

According to the first aspect of the embodiment of the invention, the second virtual VPN apparatus to which one of the at least two access lines of the second base is connected carries out the frame forwarding process according to the second forwarding table for the frames received from the second base. In this case, the second virtual VPN apparatus does not carry out frame forwarding to another VPN apparatus which accommodates the other of the at least the two access lines of the second base. Thus, returning (looping) of a frame received by the second virtual VPN apparatus from the second base to the second base via another VPN apparatus can be prevented.

In this case, the second virtual VPN apparatus can be configured not to receive any frame from the other VPN apparatus that is connected to the second base via another one of the at least two access lines. In this case, returning (looping) of a frame received by another VPN apparatus from the second base to the second base via the second virtual VPN apparatus can be prevented.

According to the first aspect of the embodiment of the invention, as the occurrence of looping is prevented by the means described above, the two access lines of the second base can be used in parallel. Thus, wasting of a band of the two access lines can be prevented.

Preferably, the first aspect of the embodiment of the invention may be configured such that:

the first virtual VPN apparatus is connected to all the other VPN apparatuses in a full-mesh shape through pseudo lines;

the second virtual VPN apparatus is connected to remained other VPN apparatuses except the one of the other VPN apparatuses that is connected to the second base via another one of the at least two access lines in a full-mesh shape through pseudo lines;

the first virtual VPN apparatus and the second virtual VPN apparatus are interconnected through a pseudo line; and the first virtual VPN apparatus and the second virtual VPN apparatus permit to forward frames received from an access line to other access lines and pseudo lines, and permit to forward frames received from a pseudo line to access lines except other pseudo lines.

Further, preferably, the first aspect of the embodiment of the invention has a configuration in which the one of the other VPN apparatuses that is connected to the second base via the another one of the at least two access lines, includes:

a third virtual VPN apparatus that is connected to another one of the first bases via an access line and carries out a frame forwarding process by using a first forwarding table for forwarding frames to be transmitted/received between two first bases or between one first base and one second base; and a fourth virtual VPN apparatus that is connected to the second base via the another one of the at least two access lines and carries out a frame forwarding process by using a second forwarding table for forwarding frames to be transmitted/received between at least two bases including the second base, the second virtual VPN apparatus does not carry out forwarding frames to the fourth virtual VPN apparatus and does not receive frames from the fourth virtual VPN apparatus.

Still further, preferably, the first aspect of the embodiment of the invention may adopt a configuration in which:

the first virtual VPN apparatus is connected to the second virtual VPN apparatus, the third virtual VPN apparatus, the fourth virtual VPN apparatus and remained other VPN apparatuses in full-mesh shape through pseudo lines;

the second virtual VPN apparatus is connected to the first virtual VPN apparatus, the third virtual VPN apparatus and the remained other VPN apparatuses except the one of other VPN apparatuses that is connected to the second base via another one of the at least two access lines in a full-mesh shape through pseudo lines;

the first virtual VPN apparatus and the second virtual VPN apparatus are interconnected through a pseudo line; and the first virtual VPN apparatus and the second virtual VPN apparatus permit to forward frames received from an access line to other access lines and pseudo lines, and permit to forward frames received from a pseudo line to access lines except other pseudo lines.

A second aspect of the embodiment of the invention is a virtual private network (VPN) apparatus included in a VPN system with other VPN apparatuses for providing virtual private network services to interconnect a plurality of bases including first bases each having an access line to the VPN system and a second base having at least two access lines to the VPN system, the VPN apparatus accommodating one of the at least two access lines extending from the second base, comprising:

a detection unit that accommodates two pseudo lines to receive frames from a frame transmission source and detects, when identical frames are almost simultaneously received from both of the two pseudo lines, that the identical frames are flooded frames arrived by flooding at the frame transmission source;

a determining unit that determines a forwarding destination for the flooded frames by using a forwarding table for forwarding frames to be transmitted/received between bases including the second base; and a filter unit that discards the flooded frames based on filter conditions when the forwarding destination for the flooded frames determined includes the one of the at least two access lines, the filter conditions including that the flooded frames are discarded when a frame identical to the flooded frames is forwarded from one of the other VPN apparatuses to the second base via another one of the at least two access lines.

According to the second aspect of the embodiment of the invention, upon detection of a flooding frame, and setting of the second base as a forwarding destination of this flooding frame, when the same frame as the flooding frame is forwarded from another VPN apparatus to the second base, the filter unit discards the flooding frame. Thus, duplicate arrival of the same frame at the second base can be prevented.

Preferably, the second aspect of the embodiment of the invention may further include:

a reception unit that receives an access line state message indicating a state of the another one of the at least two access lines; and a filter control unit that changes the filter conditions when the reception unit receives an access line state message indicating an abnormality of the another one of the at least two access lines.

In this way, for example, when the other access line is abnormal, the filter conditions are changed to forward the flooding frame to the second base without discarding the flooding frame. Thus, non-arrival of a frame to the second base can be prevented.

Preferably, in the second aspect of the embodiment of the invention, the filter control unit can be configured to determine that an abnormality has occurred in the other VPN apparatus and changes the filter conditions when the reception unit receives no access line state message to be periodically received for a predetermined time.

According to the embodiment of the invention, the occurrence of looping via the VPN regarding the base having the plurality of access lines can be prevented.

According to the embodiment of the invention, duplicate arrival of the same frame at a specific base accommodated in the VPN via the plurality of access lines can be prevented.

BRIEF DESCRIPTION OF THE DRAWINGS

FIG. 10 is a diagram showing an example of a forwarding table held by the PE #1 shown in FIGS. 8 and 9.

FIG. 11 is a diagram showing a configuration example of a frame filter unit shown in FIG. 9.

FIG. 12 is a diagram showing a format example of an access line state message.

DETAILED DESCRIPTIONS OF THE EMBODIMENTS

The embodiments of the invention will be described below with reference to the drawings. Configurations of the embodiments are only exemplary, and the invention is not limited to the configurations of the invention.

Overview of Embodiments

First, a solution to the problem (occurrence of looping) in the VPLS system shown in FIG. 4 will be described. To suppress an occurrence of looping without wasting bandwidth of access lines, E-frame forwarding to a portion (section) which is not an access line in the loop only has to be stopped.

Figure 1:
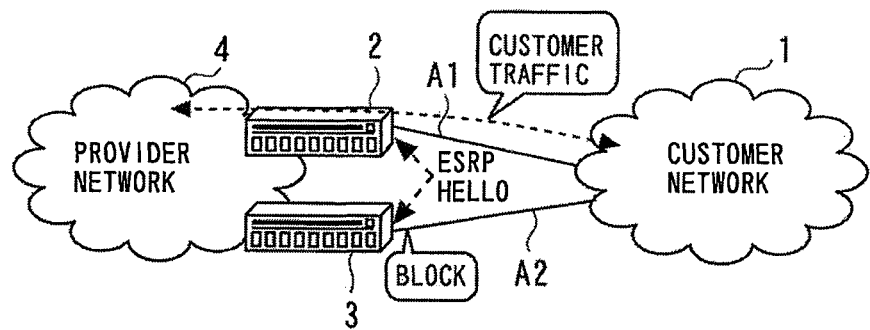
FIG. 1 is an operation diagram of ESRP (registered trademark).
Figure 2:
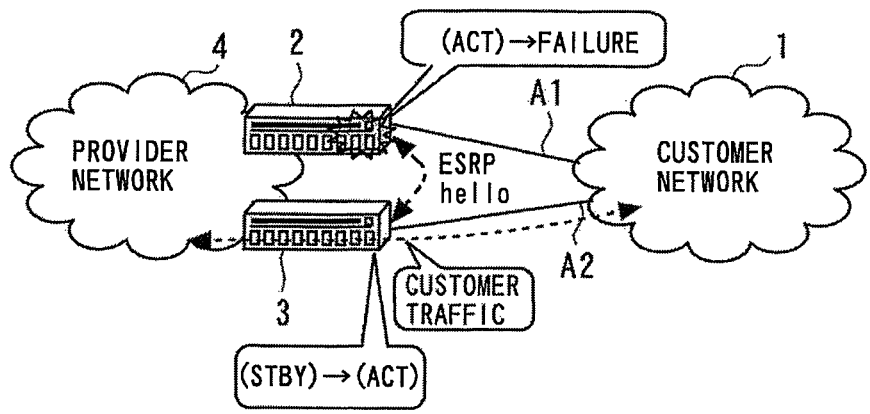
FIG. 2 is an operation diagram of the ESRP (registered trademark) showing a situation when a failure occurs in a current system (active side).
Figure 3:
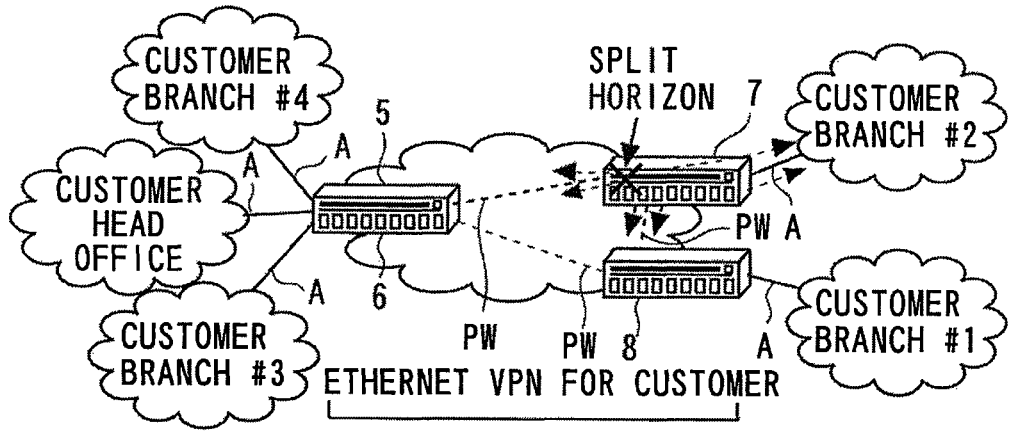
FIG. 3 is an operation diagram of a VPLS.
Figure 4:
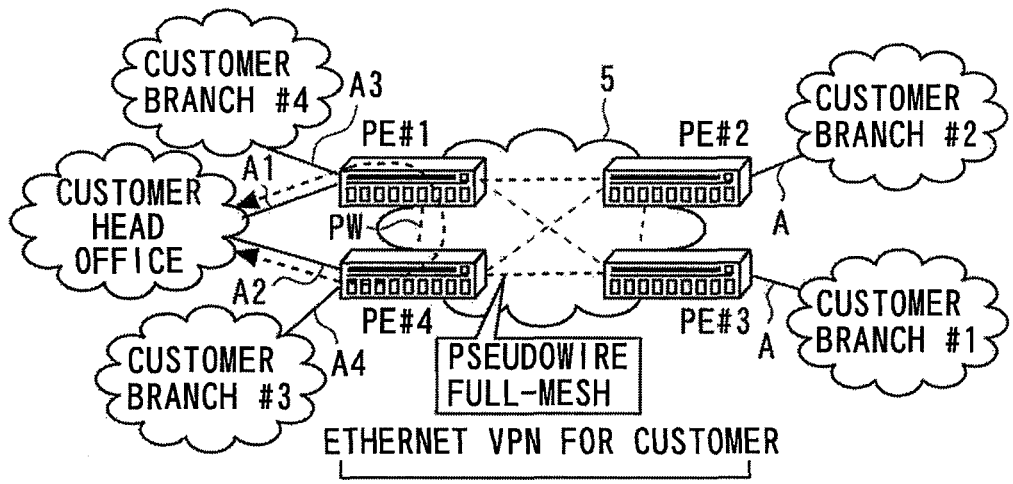
FIG. 4 is an operation diagram of the VPLS showing an occurrence of looping between a VPLS network and a customer base.

In the example shown in FIG. 4, the pseudo line (pseudowire) for interconnecting the PEs #1 and #4 is a section which is not an access line of the loop. However, when this pseudo line is simply removed, communication cannot be performed any more between the branches #4 and #3.

In this case, to block only traffic passed from the head office through the E-VPN to return to the head office, the PEs #1 and #4 respectively include a forwarding table (second forwarding table) for the head office accommodated in the VPN in a redundant manner, and a forwarding table (first forwarding table) for the other bases.

In a normal VPLS, a PE includes a forwarding table for each VPN. Forwarding for each base belonging to the same VPN is carried out by using the same forwarding table. On the other hand, the PE (VPN apparatus) of the embodiment includes a first forwarding table as a normal forwarding table and a second forwarding table exclusively used for a base having redundant paths (second base having at least two access lines).

In the specification, a function for executing forwarding processes by using one of the first and second forwarding tables is called a virtual PE. Each virtual PE is connected to the other PE and the other virtual PE through a full-mesh pseudo line.

Figure 6:
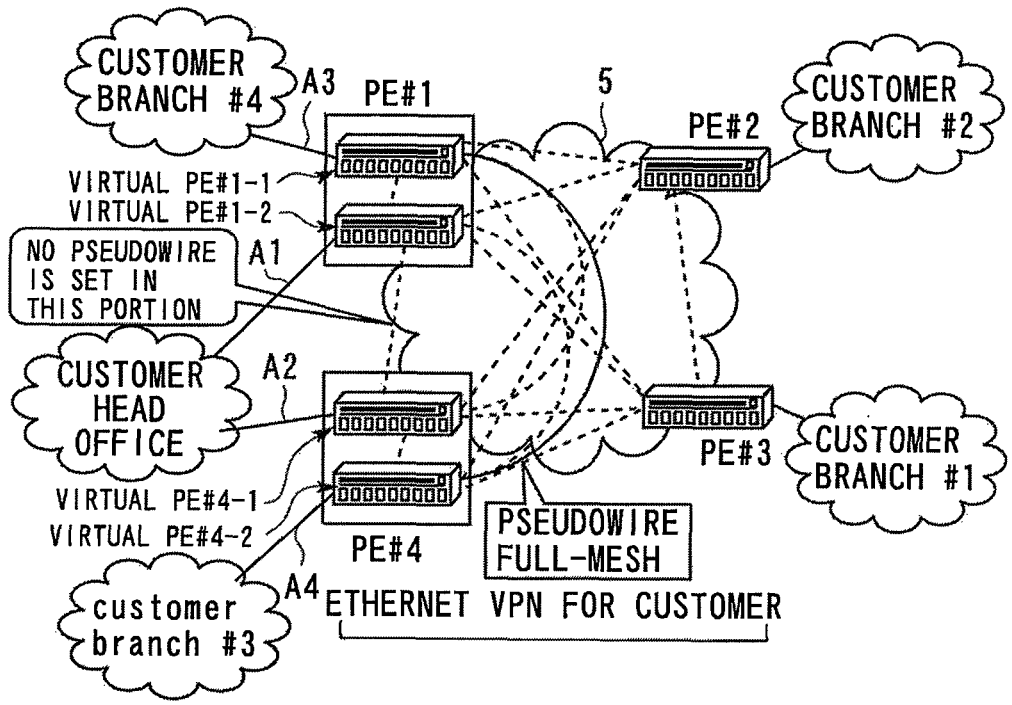
FIG. 6 is a diagram showing means for preventing an occurrence of looping in the VPLS system of the invention.

However, two virtual PEs where are respectively connected to a base (second base: head office in FIG. 4) via one of redundant access lines for connecting the base with the E-VPN, are not interconnected through a pseudo line. FIG. 6 shows a network configuration example of the VPN (E-VPN) of the invention.

The network configuration shown in FIG. 6 is different from that shown in FIG. 4 as follows. A PE #1 includes a virtual PE #1-1 (first virtual VPN apparatus) which uses a forwarding table (first forwarding table) for forwarding frames to be transmitted/received between two bases except the frames directly received from one of the redundant access lines. The PE #1 also includes a virtual PE #1-2 (second virtual VPN apparatus) which uses a forwarding table (second forwarding table) for forwarding frame to be transmitted/received between at least two bases including the base (e.g., head office) having the redundant access lines. The virtual PE #1-1 accommodates an access line A3 for a branch #4, while the virtual PE #1-2 accommodates an access line A1 for the head office.

The PE #4 includes a virtual PE #4-2 (third virtual VPN apparatus) which uses the forwarding table (first forwarding table) for forwarding frames to be transmitted/received between the two bases except the frames directly received from one of the redundant access lines, and a virtual PE #4-1 (fourth virtual VPN) which uses the forwarding table (second forwarding table) for forwarding frames to be transmitted/received between at least the two bases including the base (e.g., head office) accommodated in the redundant manner. The virtual PE #4-2 accommodates an access line A4 for a branch #3, while the virtual PE #4-1 accommodates an access line A2 for the head office. The access lines A1 and A2 are the redundant access lines.

The virtual PEs #1-1, #1-2, #4-1, and #4-2 are connected to other PEs (i.e. PEs #2 and #3) and other virtual PEs through full-mesh pseudo lines except between the virtual PE #1-2 and the virtual PE #4-1.

Thus, according to the embodiment, the PE for accommodating the redundant base is divided into two virtual PEs. According to the embodiment, full-mesh pseudo lines are set except between the virtual PEs where respectively accommodates the redundant base, and looping is prevented by a slit horizon.

A state where all the PEs and virtual PEs shown in FIG. 6 are interconnected through pseudo lines is presumed. In this case, for example, traffic (frames) directed from the branch #3 to the branch #4 passes through the virtual PEs #4-2 and #1-1 to reach the branch #4. In other words, the traffic passes through routes different from a loop between the head office and the E-VPN. On the other hand, traffic between the virtual PE #1-2 and the virtual PE #4-1 is only loop traffic.

In this case, as described above, no pseudo line is set between the virtual PE #1-2 and the virtual PE #4-1. Accordingly, frame forwarding is not carried out between the virtual PE #1-2 and the virtual PE #4-1. Thus, looping between the base (head office) accommodated in the E-VPN in a redundant manner and the E-VPN is prevented.

Figure 5:
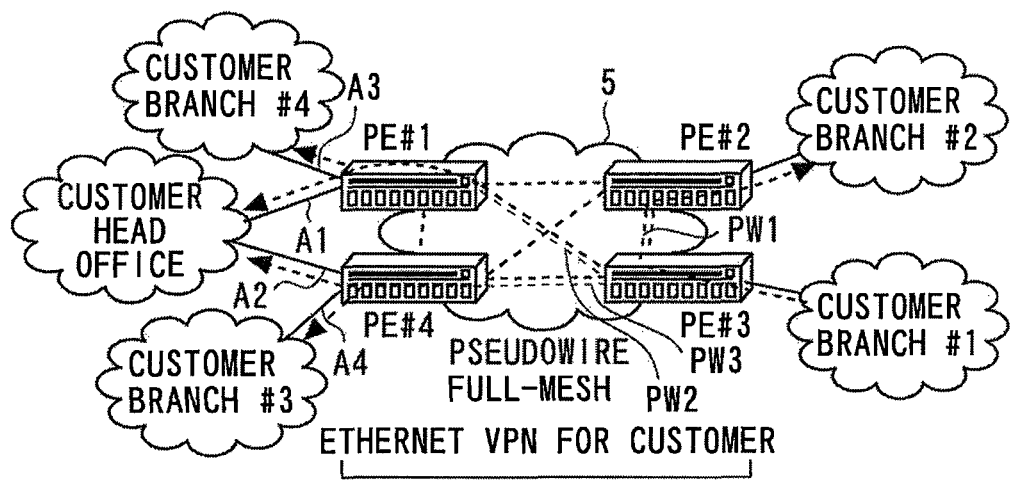
FIG. 5 is an operation diagram of the VPLS showing a situation of double arrival of frames at the customer base from the VPLS network.

Next, a solution to the problem (i.e. double (duplicate) arrival of the same frame) in the VPLS system shown in FIG. 5 will be described. To prevent duplicate arrival of frames at the base (redundant base) where the access lines have been made redundant, whether E-frames received by each PE have been subjected to flooding by the other PE in the E-VPN or unicast forwarding has to be determined (identified). As means for making this determining, the PEs may be interconnected through a plurality of pseudo lines (Pseudowire).

As described in the background art, in the VPLS, a node (PE) that has received an E-frame whose destination has not been learned from the access line performs flooding (broadcast) the E-frame and copies of the E-frame to all the pseudo lines and the access lines connected to the node itself. Thus, if the PEs are interconnected through two pseudo lines, flooded frames almost simultaneously arrive at a reception side through the two pseudo lines. On the other hand, a frame unicast-forwarded from the PE of a transmission side is received by the PE of the reception side only through one pseudo line.

Figure 7:
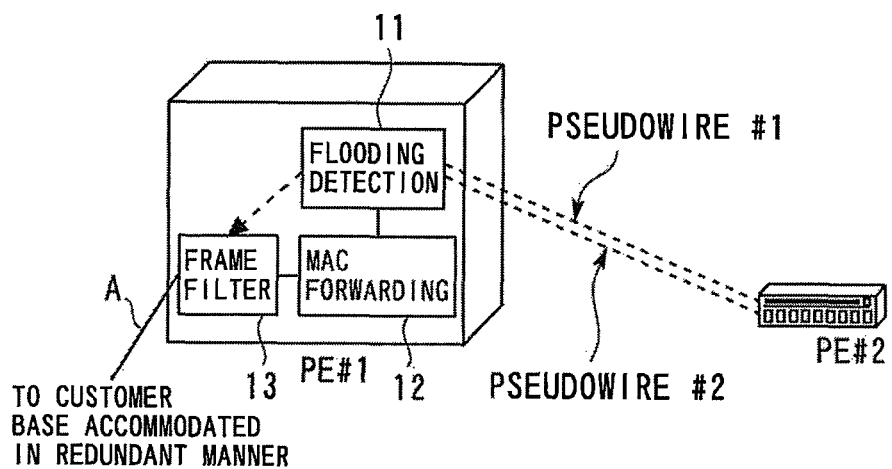
FIG. 7 is a diagram showing a configuration example of a VPLS apparatus (PE) for preventing double arrival of frames in the VPLS system according to the invention.

Based on information indicating a reception situation of the E-frame through such two pseudo lines, the flooded E-frame can be filtered (removed). FIG. 7 shows a configuration example of a PE for filtering the flooded E-frame.

In FIG. 7, the PE #1 includes a flooding detection unit (detection unit) 11, a media access control (MAC) forwarding unit (forwarding unit) 12 connected to the flooding detection unit 11, and a frame filter unit (filter unit) 13 connected to the MAC forwarding unit 12 and controlled by the flooding detection unit 11. The flooding detection unit 1 is connected to the other PE (PE #2: frame transmission source) through two pseudo lines (pseudowires) #1 and #2. The frame filter unit 13 is connected to a customer base (e.g., head office shown in FIG. 4) accommodated in a redundant manner via an access line A.

In FIG. 7, an E-frame (frame) flooded from the PE #2 passes through both pseudo lines #1 and #2 to arrive at the PE #1. When identical E-frames are almost simultaneously received from both pseudo lines #1 and #2, the flooding detection unit 11 of the PE #1 recognizes that the PE #2 has flooded the E-frame (detects flooding).

In this case, the flooding detection unit 11 considers that the E-frame has been received from one of the pseudo lines #1 and #2, and notifies information of the pseudo line of the side considered to have received the E-frame to the MAC forwarding unit 12. Accordingly, the MAC forwarding unit 12 recognizes that the E-frame has arrived from the pseudo line of the side notified from the flooding detection unit 11, and learns a forwarding table entry for this source address. In other words, the MAC forwarding unit 12 includes a forwarding table, and registers an entry indicating a relation between a source address of an E-frame and a reception pseudo line in the forwarding table.

After learning, the MAC forwarding table 12 floods this E-frame. Accordingly, the E-frame is sent to the frame filter unit 13 disposed between the access line A and the MAC forwarding unit 12. The frame filter unit 13 conducts filtering (blocking) the E-frame whose flooding has been detected (recognized) under control of the flooding detection unit 11.

A PE having a configuration of the PE #1 shown in FIG. 7 accommodates a plurality of access lines (at least two access lines) extending from the base accommodated in a redundant manner. Then, a filtering process is carried out so that one of two PEs where accommodate the two access lines can forward the flooded E-frame to the access line, and the other PE can conduct filtering the flooded E-frame. Thus, double arrival of the same E-frame at the base where the access lines have been made redundant is prevented.

According to the invention, by efficiently using bandwidth of the access lines for the customer base where the access lines to the VPN have been made redundant, looping of the E-frame or double arrival can be prevented.

Specific Example

Figure 8:
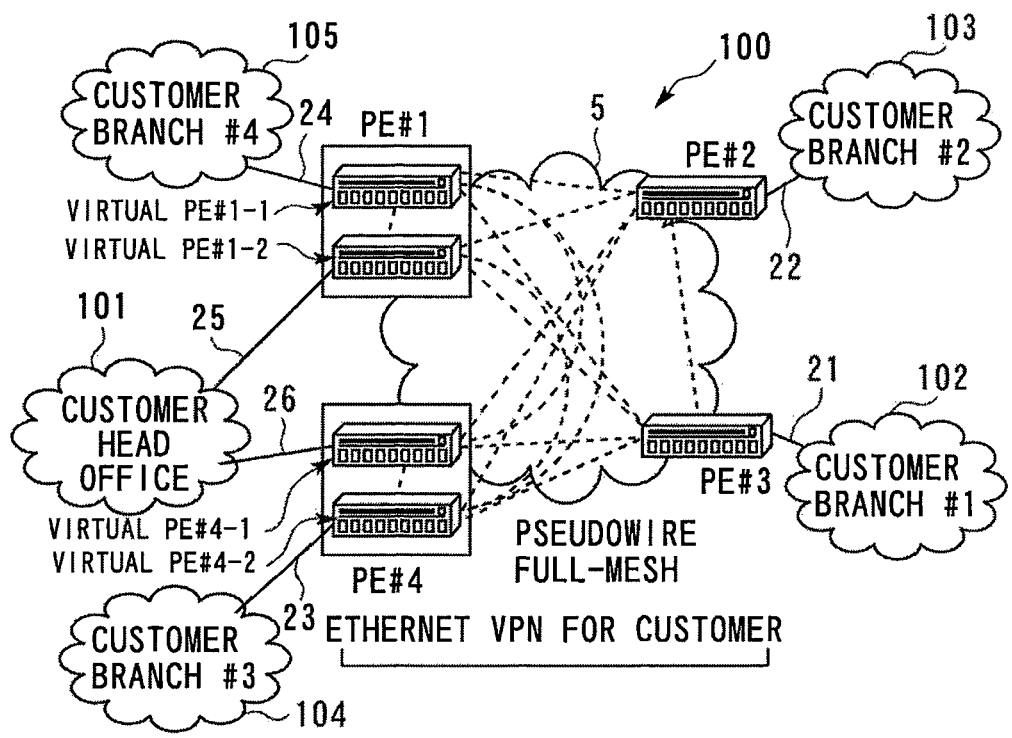
FIG. 8 is a diagram showing a configuration example of a VPLS system (VPLS network) according to a specific example of the invention.

FIG. 8 shows a configuration example of a VPLS network (VPN system) according to an embodiment of the invention. FIG. 8 shows the VPLS network which accommodates a plurality of customer bases via a plurality of access lines. As a plurality of bases, in FIG. 8, five customer bases including a customer head office 101, and branches #1 (102), #2 (103), #3 (104), and #4 (105) are connected to the VPLS network. The plurality of bases 101 to 105 belong to the same VPN (virtual private network) provided by the VPLS network, and are set as if they are connected to the same Ethernet (registered trademark) via the VPN.

In the example of FIG. 8, as a VPLS network, a MPLS network (provider network) 5 of the VPLS provider is applied. The provider network 5 includes a plurality of provider edge switches (PE: equivalent to VPLS apparatus or VPN apparatus) for accommodating a plurality of bases. Each PE is arranged in an edge portion of the provider network 5 to accommodate at least one of access line of each base.

In the example of FIG. 8, the provider network 5 includes PEs #1 to #4 to accommodate the head office 101 and the branches 102 to 105 (#1 to #4). The branch 102 is connected to the PE #3 via a single access line 21. The branch 103 is connected to the PE #2 via a single access line 22. The branch 104 is connected to the PE #4 via a single access line 23. The branch 105 is connected to the PE #1 via a single access line 24.

The head office 101 is connected (accommodated), to improve failure resistance of connection with the VPLS network (VPN), to the PE #1 via an access line 25, and to the PE #4 via an access line 26. The branches 102 to 105 correspond to a plurality of first bases of an aspect of the invention, and the head office 101 corresponds to at least one second base of an aspect of the invention.

In this case, each of the PEs #1 to #4 for accommodating the base (head office 1) accommodated in the VPLS network (VPN) in a redundant manner functions as an apparatus which includes a first virtual PE (first virtual VPN apparatus) for performing forwarding/flooding processes by using a first forwarding table to execute forwarding (normal forwarding) regarding an E-frame (hereinafter, simply referred to as "frame") to be transmitted/received between two bases among the plurality of bases 101 to 105 connected to the VPN via the single access lines except the E-frames directly received from one of the redundant access lines, and a second virtual PE (second virtual VPN apparatus) for performing forwarding/flooding processes by using a second forwarding table to execute forwarding of a frame to be transmitted/received between at least two bases including the second base accommodated in the VPN in a redundant manner (accommodated in the VPN via at least two access lines).

In FIG. 8, the PE #1 includes a virtual PE (V-PE) #1-1 equivalent to the first virtual PE (first virtual VPN apparatus), and a virtual PE #1-2 equivalent to the second virtual PE (second virtual VPN apparatus). The access line 24 for the branch #4 (105) is connected to the virtual PE #1-1. One (access line 25) of the access lines for the head office 101 is connected to the virtual PE #1-2.

The PE #4 includes a virtual PE #4-1 equivalent to the second virtual PE (fourth virtual VPN apparatus), and a virtual PE #4-2 equivalent to the first virtual PE (third virtual VPN apparatus). The access line 23 for the branch #3 (104) is connected to the virtual PE #4-2. The other (access line 26) of the access lines for the head office 101 is connected to the virtual PE #4-1.

In the provider network 5, in principle, the PEs and the virtual PEs are connected to all the PEs and virtual PEs belonging to the same VPN via Pseudowire (PW: pseudo lines) (a plurality of pseudo lines are set in the provider network 5). In other words, between the PEs, between the virtual PEs, and between the PE and the virtual PE are respectively connected with the pseudo lines in full-mesh shapes except between virtual PEs which accommodates at least one of redundant access lines. In FIG. 8, the access lines 21 to 26 are indicated by solid lines, and the pseudo lines are indicated by broken lines.

For example, the PE #2 is connected to the PE #3, and the virtual PEs #1-1, #1-2, #4-1, and #4-2 through pseudo lines. Alternatively, the virtual PE #1-1 is connected to the PEs #2 and #3, and the virtual PEs #1-2, #4-1, and #4-2 through pseudo lines. However, the virtual PEs (virtual PEs #1-2 and #4-1) which respectively accommodate one of the redundant access lines (access lines 25 and 26) are not connected with each other through a pseudo line.

The PE and the virtual PE suppress an occurrence of looping in the provider network 5 by applying a split horizon which uses pseudo lines. In other words, the PE and the virtual PE do not forward or flood a frame received from a pseudo line to another pseudo line.

With the aforementioned configuration, an occurrence of looping regarding the head office 101 is suppressed. For example, it is presumed that the virtual PE #1-2 receives a frame from the head office 101 via the access line 25, and floods this frame. The flooded frames are forwarded through pseudo lines to the PEs #2 and #3 and the virtual PEs #1-1 and #4-2.

However, as no pseudo line is set between the virtual PE #1-2 and the virtual PE #4-1, the flooded frame does not arrive at the virtual PE #4-1. Accordingly, it never happens that the virtual PE #4-1 receives the flooded frame from the virtual PE #1-2, and floods, as a forwarding destination of the flooded frame is yet to be learned, the flooded frame is flooded again, and the flooded frame returns to the head office 101.

According to the specific example of FIG. 8, returning of the E-frame transmitted from the head office 101 through between the PEs #1 and #4 to the head office 101 can be prevented. The frame transmitted from each base to the E-VPN can arrive at a destination base via the PE or the virtual PE which accommodates the destination base of the frame without any looping in the VPN by the split horizon.

Figure 9:
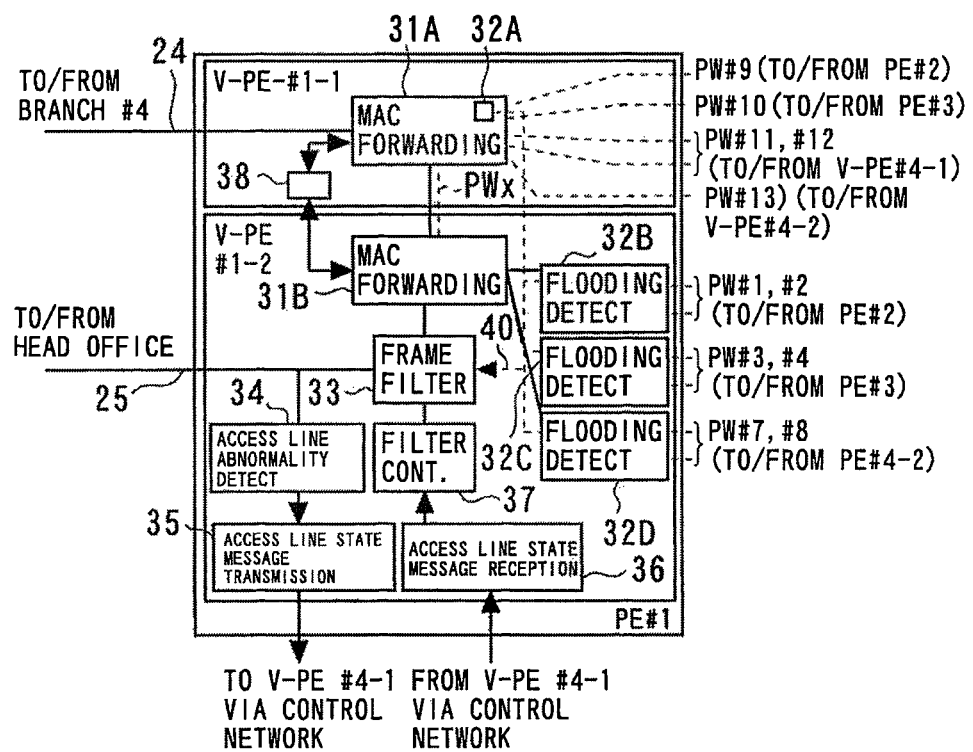
FIG. 9 is a diagram showing a block configuration example of a PE #1 (VPLS apparatus) shown in FIG. 8.

FIG. 9 shows a functional block configuration example of the PE #1 shown in FIG. 8. The PE #4 also has a configuration shown in FIG. 9. In FIG. 9, the virtual PE #1-1 (first virtual PE) includes a MAC forwarding unit 31A for forwarding/flooding frames received from the access line and a plurality of pseudo lines connected to the virtual PE #1-1.

The MAC forwarding unit 31A is connected to the access line 24 of the branch #4 (105). The MAC forwarding unit 31A accommodates one pseudo line (PW #9) connected to the PE #2, one pseudo line (PW #10) connected to the PE #3, two pseudo lines (PW #11 and PW #12) connected to the virtual PE #4-1, and one pseudo line (PW #13) connected to the virtual PE #4-2.

The MAC forwarding unit 31A includes a flooding detection unit 32A for detecting flooding of the virtual PE #4-1. The flooding detection unit 32A is connected to the PWs #11 and the PW #12.

The virtual PE #1-2 (second virtual PE) includes a MAC forwarding unit 31B (equivalent to the forwarding unit of the invention) for forwarding/flooding a frame received through the access line 25 and the pseudo line accommodated in the virtual PE #1-2.

The virtual PE #1-2 includes a plurality of flooding detection units 32B, 32C, and 32D (each equivalent to the detection unit of the invention) for detecting frames flooded by the PE #2, the PE #3 and the virtual PE #4-2. The flooding detection units 32B, 32C, and 32D are connected to the MAC forwarding unit 31B.

The flooding detection unit 32B accommodates two pseudo lines (PW #1 and PW #2) connected to the PE #2. The flooding detection unit 32C accommodates two pseudo lines (PW #3 and PW #4) connected to the PE #3. The flooding detection unit 32D accommodates two pseudo lines (PW #7 and PW #8) connected to the virtual PE #4-2.

The virtual PE #1-2 accommodates the access line 25 of the head office 101 which includes the redundant access lines 25 and 26. Accordingly, the virtual PE #1-2 includes a frame filter unit 33 (equivalent to the filter unit of the aspect of the invention) to prevent double arrival of the same frame at the head office 101.

The virtual PE #1-2 includes an access line failure detection unit 34 (equivalent to a monitoring unit) for detecting failures to an access line, an access line failure message transmission unit 35 (equivalent to transmission unit) an access line failure message reception unit 36 (equivalent to the reception unit of the invention), and a filter control unit 37 (equivalent to filter control unit). The virtual PE #1-1 accommodates the branch #4 (105) not made redundant via the access line 24. Accordingly, the virtual PE #1-1 does not include blocks 34 to 37.

The virtual PE #1-2 accommodates the access line 25 of the head office 101 which includes the access lines 25 and 26. Thus, as described above, two pseudo lines are respectively set between the virtual PE #1-2 and the PE #2 and the PE #3, and between the virtual PE #1-2 and the virtual PE #4-2, and flooding detection units 32B, 32C, and 32D corresponding to the PE #2 and the PE #3, and the virtual PE #4-2 are provided.

On the other hand, basically, the virtual PE #1-1 doesn't have to detect flooding because it has no frame filter unit 33. Accordingly, the virtual PE #1-1 is connected to each of the PE #2 and the PE #3 and the virtual PE #4-2 excluding the virtual PE #4-2 which accommodates a customer head office through one pseudo line. However, as described above, to detect a flooded frame from the virtual PE #1-1 in the virtual PE #4-1, the virtual PE #1-1 includes the two pseudo lines (PE #11 and PE #12) to the virtual PE #4-1. Also, The Virtual PE #4-1 includes the mechanism 32A to notify that a frame is flooded from virtual PE #4-1 to virtual PE #4-2.

Each of the MAC forwarding units 31A and 31B executes forwarding/flooding processes based on registered contents of a forwarding table 38. FIG. 10 shows an example of a forwarding table 38 of the PE #1.

An upper half entry group 38A in the forwarding table 38 corresponds to the first forwarding table referred to by the MAC forwarding unit 31A of the virtual PE #1-1, and a lower half entry group 38B corresponds to the second forwarding table referred to by the MAC forwarding unit 31B of the virtual PE #1-2.

The normal VPLS apparatus includes a forwarding table for each VPN. However, one of the features of the embodiment of the invention is that even a customer base belonging to the same VPN has an exclusive forwarding table different from a normal forwarding table regarding a specific base.

The head office 101 corresponds to a virtual PE number "#1-2" in the forwarding table 38, and the branch #4 (105) corresponds to a virtual PE number "#1-1" in the forwarding table 38. In other words, in FIG. 10, an exemplary entry group for frames received from the access line 24 and an exemplary group for frames received from the access line 25 are registered.

The plurality of access lines and the plurality of pseudo lines (PW) accommodated by the PE #1 belong to one of the virtual PEs #1-1 and #1-2 as shown in FIG. 9. Each line connected to each of the MAC forwarding units 31A and 31B (when the MAC forwarding units 31A and 31B are not distinguished from each other, referred to as "MAC forwarding unit 31") and a virtual PE number are associated with each other beforehand, and an entry where a virtual PE number corresponding to a reception line has been registered is referred to.

Specifically, the MAC forwarding unit 31 refers to an entry containing a virtual PE number corresponding to an access line or a pseudo line which has received a frame to retrieve an entry where a destination MAC address of the received frame has been registered. Upon retrieval of the entry, the MAC forwarding unit 31 forwards the frame to a line defined as a transmission destination in the retrieved entry.

On the other hand, if no entry corresponding to the destination MAC address of the frame is retrieved from the forwarding table 38, the MAC forwarding unit 31 floods the frame and copies of the frame to all the access lines and pseudo lines connected to itself. However, a frame received from a pseudo line is not flooded with respect to another pseudo line (split horizon).

Forwarding between virtual PEs in the same PE (e.g., between the virtual PE #1-1 and the virtual PE #1-2 in the PE #1) is treated presuming that a pseudo line (PW) is set therebetween as it corresponds to forwarding between different logical PEs. In other words, the MAC forwarding units 31A and 31B (virtual PEs #1-1 and #1-2) are interconnected through a pseudo line PWx.

However, in the example of FIG. 9, the virtual PE #1-2 accommodates the head office 101, and needs information of flooding executed by the virtual PE #1-1. In this case, upon detection of frame flooding in virtual PE #1-1, the flooding detection unit 32A directly controls the frame filter unit 33 through a control line 40. When the MAC forwarding unit 31A carries out flooding, flooding information is notified to the frame filter unit 33 through the control line 40.

Upon reception of a frame, the MAC forwarding unit 31 checks a source MAC address of the received frame to determine whether the same address as this source MAC address has been registered in the forwarding table 38. If the same address as the source MAC address has not been registered, the MAC forwarding unit 31 learns an address of this frame as in the case of a normal E-switch. In other words, the MAC forwarding unit 31 registers a new entry where an access line or a pseudo line which has received the frame is defined as a transmission destination, and the source MAC address is defined as a destination MAC address in the forwarding table 38.

To prevent double arrival of a frame at a specific customer base (head office 101), the virtual PE #1-2 has to detect whether the other PE or virtual PE has executed flooding. For this purpose, the virtual PE #1-2 includes flooding detection units 32B, 32C, and 32D. Each flooding detection unit 32 is connected to the other PE or virtual PE through two pseudo lines (corresponding to the PW #1 and the PW #2 as shown FIG. 7).

When the flooding detection unit 32 almost simultaneously receives identical frames from two pseudo lines which are accommodated therein, the flooding detection unit 32 determines that flooding has been carried out by the PE or the virtual PE of a transmission source of this frame (detects flooding). In this case, the flooding detection unit 32 discards one of the received two frames, sends the remaining frame together with received information of the pseudo line to the corresponding MAC forwarding unit 31 (one of the MAC forwarding units 31A and 31B), and sends the execution of flooding (flooding information) to the frame filter unit 33.

On the other hand, upon reception of a frame from only one of the two pseudo lines, the flooding detection unit 32 sends this frame together with the received pseudo line information to the corresponding MAC forwarding unit 31.

Upon reception of a unicast frame from the MAC forwarding unit 31, the flooding detection unit 32 sends the frame to one of the two pseudo lines according to transmission destination information of the forwarding table 38.

Upon reception of a flooded frame from the corresponding MAC forwarding unit 31, the flooding detection unit 32 sends the same frame to each of the two pseudo lines in the case of setting where the destination PE or the virtual PE of the pseudo line accommodates a redundant base (head office 101), and sends the frame to only one of the two pseudo lines if not.

The frame filter unit 33 has a function of filtering one of two identical frames which respectively arrive at the virtual PE #1-2 accommodating the access line 25 and the virtual PE #4-1 accommodating the access line 26 by flooding, and operates according to a control signal from the flooding unit 32.

The frame filter unit 33 is disposed in each of all the PEs and virtual PEs which accommodate redundant access lines. Only one of the frame filter units 33 of the PEs and the virtual PEs transmits a flooding detected frame, while the remaining filter units 33 of the PEs and the virtual PEs discards frames.

One conceivable example of an algorithm for filtering a frame is as follows. For example, each of the frame filter units 33 (plurality of filter frame units 33) of all the PEs or the virtual PEs accommodating bases having a plurality of redundant access lines calculates a hash value by using the same hash function. Then, the hash value is compared with a predetermined threshold value. Based on a result of the comparison, only one of the plurality of frame filter units 33 transmits a frame, while the remaining frame filter units 33 discard frames. For example, only one of the plurality of frame filters 33 transmits a frame having a hash value larger than the threshold value without discarding it, while the remaining frame filter units 33 discard frames having hash values equal to or smaller than the threshold value.

FIG. 11 shows a configuration example of the frame filter unit 33 shown in FIG. 8. Each of the virtual PE #1-2 and the virtual PE #4-1 includes the frame filter units 33 having a configuration shown in FIG. 11. To simplify description of the frame filter unit 33, the frame filter unit 33 shown in FIG. 11 is presumed to be mounted on the virtual PE #1-2.

In FIG. 11, the frame filter unit 33 includes a discard determining unit 41, and a hash calculation unit 42. Frames are entered to the discard determining unit 41 and the hash calculation unit 42 from the MAC forwarding unit 31B. The hash calculation unit 42 carries out hash calculation for a frame by using a predetermined hash function to send a hash value to the discard determining unit 41. The discard determining unit 41 is configured to receive a flooding detection signal (flooding information) from the flooding detection unit 32 through the control line 40.

If no flooding detection signal is received, the discard determining unit 41 sends a frame from the MAC forwarding unit 31B to the access line (access line 25) without discarding the frame. On the other hand, upon reception of a flooding detection signal, the discard determining unit 41 makes discard determining regarding the frame from the MAC forwarding unit 31B.

In the discard determining unit 41, a predetermined threshold value for a hash value, frame discard conditions based on a threshold value determining result are set by the filter control unit 37. In the filter control unit 37, threshold value/discard conditions (filter conditions) to be notified to the discard determining unit 41 from the outside are set. As filter conditions, for example, one of a first condition for discarding a frame when a hash value is larger than a threshold value and a second condition for discarding a frame when a hash value is equal to or lower than a threshold value can be set.

The discard determining unit 41 compares a hash value with a threshold value. If a result of the comparison matches one of the first and second conditions set in the discard determining unit 41, the discard determining unit 41 discards (filters) a frame. If not, the discard determining unit 41 sends the frame to the access line without discarding it. For example, if the first condition is set in the discard determining unit 41, the discard determining unit 41 discards a frame whose hash value is larger than the threshold value, but passes frames whose hash values are equal to or lower than the predetermined value.

When the first condition is set in the virtual PE #1-2, the second condition is set in the virtual PE #4-1. Conversely, when the second condition is set in the virtual PE #1-2, the first condition is set in the virtual PE #4-1. Identical discard conditions are never simultaneously set in both of the virtual PE #1-2 and the virtual PE #4-1.

Accordingly, when the same E-frame arrives at both of the virtual PE #1-2 and the virtual PE #4-1, one of the two discard determining units 41 discards the frame, while the other discard determining unit 41 sends the frame to the access line. Thus, double arrival of the same frame at the base (head office 101) accommodated in a redundant manner is prevented. By adjusting a threshold value, for example, frames can be transmitted from the respective virtual PEs #1-2 and #4-1 to the customer base (head office 101) with a desired distribution rate.

Filter conditions can be changed (including releasing (removing)) by the filter control unit 37. For example, upon reception of an access line state message indicating a failure (abnormality) of the access line 26 accommodated in the virtual PE #4-1, the access line state message reception unit 36 notifies the failure of the access line 26 to the filter control unit 37. Then, the filter control unit 37 instructs the discard determining unit 41 to change filter conditions (e.g., release filter conditions). When a failure occurs in the access line 26, a frame cannot be forwarded from the virtual PE #4-1 to the head office 101. In this case, by releasing the failure conditions of the virtual PE #1-2, the same frame can be forwarded from the virtual PE #1-2 to the head office 101 through the normal access line 25.

In the configuration example of FIG. 11, the frame received from the access line 25 is always transmitted through the frame filter unit 33 to be passed to the MAC forwarding unit 31B.

Returning to FIG. 9, the access line abnormality detection unit 34 detects link down of the Ethernet (registered trademark), or detects an abnormality of the access line by using a function such as the Ethernet (registered trademark) OAM defined in IEEE802.3ah or IEEE802.1ag or OAM of ITU-T Recommendation Y. 1731.

Upon detection of an abnormality of the access line (access line 25 in the example of FIG. 9) by the access line abnormality detection unit 34, the access line state message transmission unit 35 notifies the abnormality detection to another PE or virtual PE (virtual PE #4-1 in the example of FIG. 9) which has accommodated the access line (access line 26) which has been made redundant with the access line 25. In other words, an access line state message indicating the abnormality of the access line is transmitted.

By periodically exchanging access line state messages with the PE or the virtual PE which accommodates one redundant access line, they may be used for monitoring a normal operation of the PE or the virtual PE. In other words, even when no access line state message to be cyclically or periodically received is received, a failure can be judged to have occurred in the PE or the virtual PE to which the access line state message should be transmitted.

FIG. 12 shows a format example of an access line state message. In FIG. 12, the access line state message can contain an identifier of a message transmission source PE or virtual PE, an identifier of a destination PE or virtual PE, and access line state abnormality detection information.

The access line state message reception unit 36 receives an access line state message from the other PE or virtual PE. Regarding a base including redundant access lines, when an abnormality is detected in one of the plurality of redundant access lines, or a failure occurs in one of the PEs or virtual PEs accommodating the base, there is a possibility that some or all of flooded frames to the base will not be received by the base. Accordingly, The PEs or virtual PEs accommodating the base accommodated in a redundant manner monitor a state of access lines with each other and a state of the PE/virtual PE. An abnormality of the PE or the virtual PE is detected, for example, when no access line state message to be periodically sent is received for a given period.

The filter control unit 37 changes filter conditions (threshold value/discard conditions) to be given to the frame filter unit 33 according to the abnormality of the access line or the abnormality of the PE or the virtual PE detected by the access line state message reception unit 36. A relation between the abnormal access line, the abnormal PE, and virtual PE and changed contents of the filter conditions is decided beforehand to be preset in the filter control unit 37. The filter control unit 37 gives a changing instruction of the filter conditions to the frame filter unit 33, as needed, according to a reception situation of the access line state message at the access line state message reception unit 36, or contents of the access line state message.

Each of the PE #2 and PE #3 shown in FIG. 8 has a block configuration substantially similar to that of the virtual PE #1-1 shown in FIG. 9 except to the flooding detection unit 32A.

The example of FIG. 9 described above is directed to the use of a common (one) forwarding table 38 by the virtual PE #1-1 and the virtual PE #1-2 in the PE #1. However, a configuration can be applied where one of the first and second forwarding tables is provided for each virtual PE. For example, the embodiment can be modified such that the virtual PE #1-1 includes a first forwarding table having only an entry group 38A shown in FIG. 10, and the virtual PE #1-2 includes a second forwarding table having only an entry group 38B shown in FIG. 10.

In the example of FIG. 9 described above, the two MAC forwarding units 31A and 31B are provided. However, physically, one MAC forwarding unit may logically function as the two MAC forwarding units 31A and 31B, thereby realizing two virtual PEs.

The specific examples of FIGS. 8 to 12 have been directed to the VPLS system (VPN system) when each of the PE #1 and the PE #4 accommodating the redundant access lines 25 and 26 of the head office 101 includes a virtual PE. However, even when in place of such a VPN system, the PE accommodating one of the plurality of access lines of the redundant base accommodates only the access line, the invention is realized.

Figure 13:
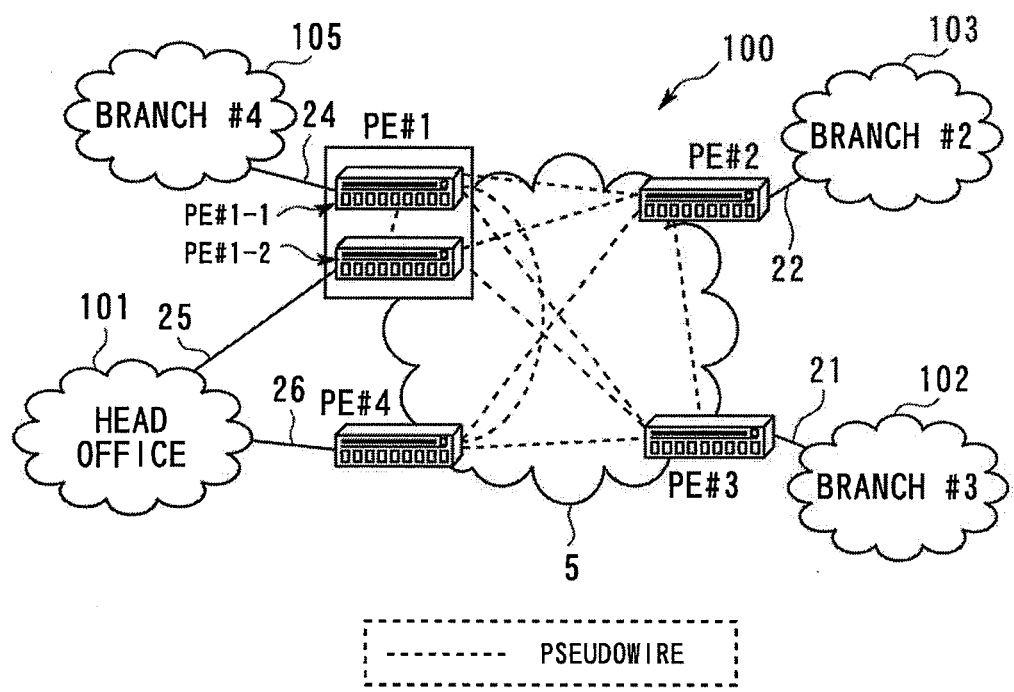
FIG. 13 is a diagram showing a case where the number of PEs having virtual PEs is one in the VPLS system according to the invention.

For example, as shown in FIG. 13, a case where the PE #4 accommodates only the access line 26 of the head office 101 but not the access lines of the other bases will be assumed. In this case, the PE #4 does not have to include two virtual PEs. In this case, however, as looping may occur if the virtual PE #1-2 and the PE #4 are interconnected through a pseudo line, no pseudo line is set therebetween. The PE #4 shown in FIG. 13 has a configuration substantially similar to that of the virtual PE #4-1 shown in FIG. 9.

According to the aforementioned embodiment of the VPLS system (VPN system), regarding the customer base (customer head office) which includes a plurality of redundant access lines (access lines 25 and 26), returning of the E-frame sent from the customer head office to one of the access lines 25 and 26 and passed through the PE #1 and the PE #4, to the customer head office through the other of the access lines 25 and 26 (looping of the E-frame) can be prevented. Thus, a band of the plurality of access lines can be properly used.

Furthermore, according to the embodiment of the VPLS system, double arrival of the E-frame flooded in the VPLS network at the customer head office through both of the access lines 25 and 26 can be prevented.

<Others>

The disclosures of Japanese patent application No. JP2007-071145 filed on Mar. 19, 2007 including the specification, drawings and abstract are incorporated herein by reference.

What is claimed is:

1. A virtual private network (VPN) apparatus included in a network with other VPN apparatuses for providing virtual private network services to interconnect a plurality of bases including first bases each of which is connected to the network via a single access line and a second base connected to the network via at least two access lines, the VPN apparatus comprising:

a first virtual VPN apparatus that is connected to one of the first bases via the single access line of the one of the first bases and carries out a frame forwarding process by using a first forwarding table for forwarding frames received from the one of the first bases via the single access line; and a second virtual VPN apparatus that is connected to the second base via one of the at least two access lines, carries out a frame forwarding process by using a second forwarding table for forwarding frames received from the second base via the one of the at least two access lines, and does not carry out forwarding frames to one of the other VPN apparatuses that is connected to the second base via another one of the at least two access lines, wherein:

the first virtual VPN apparatus is connected to all the other VPN apparatuses in a full-mesh shape through pseudo lines;

the second virtual VPN apparatus is connected to remained other VPN apparatuses except the one of the other VPN apparatuses that is connected to the second base via another one of the at least two access lines in a full-mesh shape through pseudo lines;

the first virtual VPN apparatus and the second virtual VPN apparatus are interconnected through a pseudo line; and the first virtual VPN apparatus and the second virtual VPN apparatus permit to forward frames received from an access line to other access lines and pseudo lines, and permit to forward frames received from a pseudo line to access lines except other pseudo lines.

2. The VPN apparatus according to claim 1, wherein the one of the other VPN apparatuses that is connected to the second base via another one of the at least two access lines, includes:

a third virtual VPN apparatus that is connected to another one of the first bases via an access line and carries out a frame forwarding process by using a first forwarding table, which has a same type of the first forwarding table included in the first virtual VPN apparatus, for forwarding frames to be transmitted/received between two first bases or between one first base and one second base; and a fourth virtual VPN apparatus that is connected to the second base via the another one of the at least two access lines and carries out a frame forwarding process by using a second forwarding table, which has a same type of the second forwarding table included in the second virtual VPN apparatus, for forwarding frames to be transmitted/received between at least two bases including the second base, the second virtual VPN apparatus does not carry out forwarding frames to the fourth virtual VPN apparatus and does not receive frames from the fourth virtual VPN apparatus.

3. The VPN apparatus according to claim 2, wherein:

the first virtual VPN apparatus is connected to the second virtual VPN apparatus, the third virtual VPN apparatus, the fourth virtual VPN apparatus and remained other VPN apparatuses in full-mesh shape through pseudo lines;

the second virtual VPN apparatus is not connected to the forth virtual VPN apparatus via a pseudo line and is connected to the third virtual VPN apparatus and the remained other VPN apparatuses except the one of other VPN apparatuses including the third virtual VPN apparatus and the fourth virtual VPN apparatus in a full-mesh shape through pseudo lines;

the first virtual VPN apparatus and the second virtual VPN apparatus are interconnected through a pseudo line; and the first virtual VPN apparatus and the second virtual VPN apparatus permit to forward frames received from an access line to other access lines and pseudo lines, and permit to forward frames received from a pseudo line to access lines except other pseudo lines.

4. The VPN apparatus according to claim 1, wherein the second virtual VPN apparatus includes:

a detector that accommodates two pseudo lines to receive frames from a frame transmission source and detects, when identical frames are almost simultaneously received from both of the two pseudo lines, that the identical frames are flooded frames by flooding at the frame transmission source;

a determination circuit that determines a forwarding destination for the flooded frames arrived by using the second forwarding table; and a filter that discards the flooded frames based on filter conditions when the forwarding destination for the flooded frames determined includes the one of the at least two access lines, the filter conditions including that the flooded frames are discarded when a frame identical to the flooded frames is forwarded from the one of the other VPN apparatuses to the second base.

5. The VPN apparatus according to claim 4, wherein the second virtual VPN apparatus further includes:

a receiver that receives an access line state message indicating a state of the another one of the at least two access lines; and a filter control circuit that changes the filter conditions when the reception unit receives an access line state message indicating an abnormality of the another one of the at least two access lines.

6. The VPN apparatus according to claim 5, wherein the second virtual VPN apparatus further includes:

a monitor that monitors a state of the one of the at least two access lines; and a transmitter that transmits an access line state message including an access line state based on a monitoring result of the monitor to the one of the other VPN apparatuses.

7. The VPN apparatus according to claim 5, wherein the filter control circuit determines that an abnormality has occurred in the one of the other VPN apparatuses and changes the filter conditions when the receiver receives no access line state message to be periodically received for a predetermined time.

* * * * *